April 5, 1949.   J. J. OSPLACK   2,466,123
METHOD OF MAKING SPINDLE BEARINGS
Filed Nov. 15, 1943   2 Sheets-Sheet 2
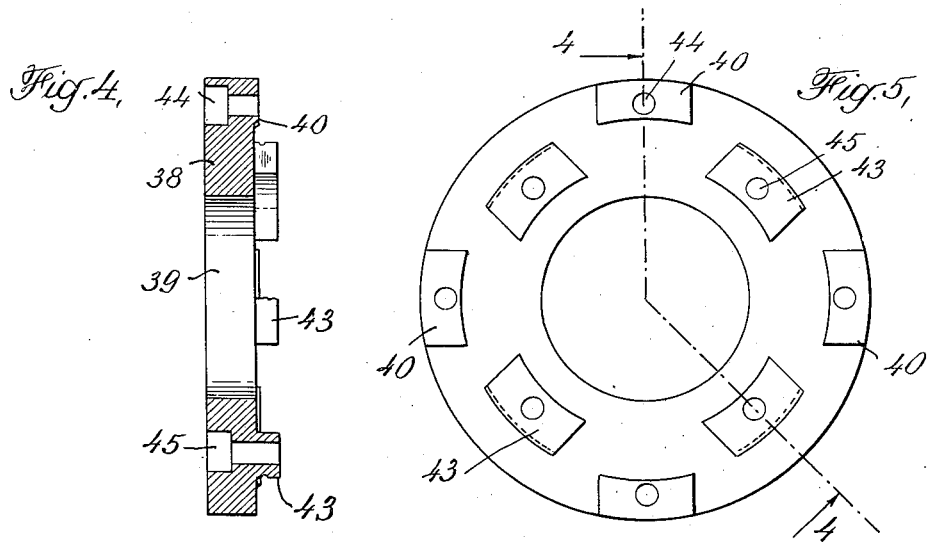
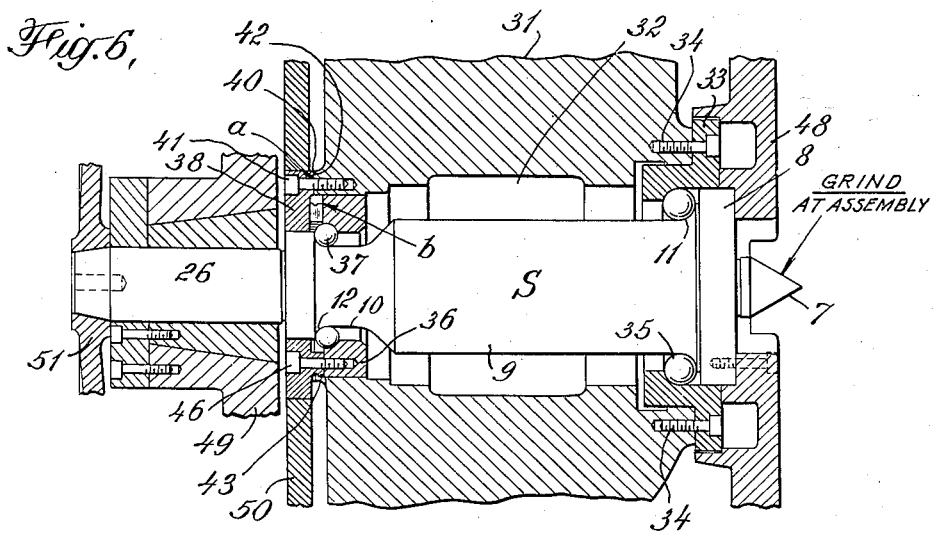
INVENTOR.
Joseph J. Osplack
BY
Pennie, Davis, Marvin & Edmonds
HIS ATTORNEYS Patented Apr. 5, 1949

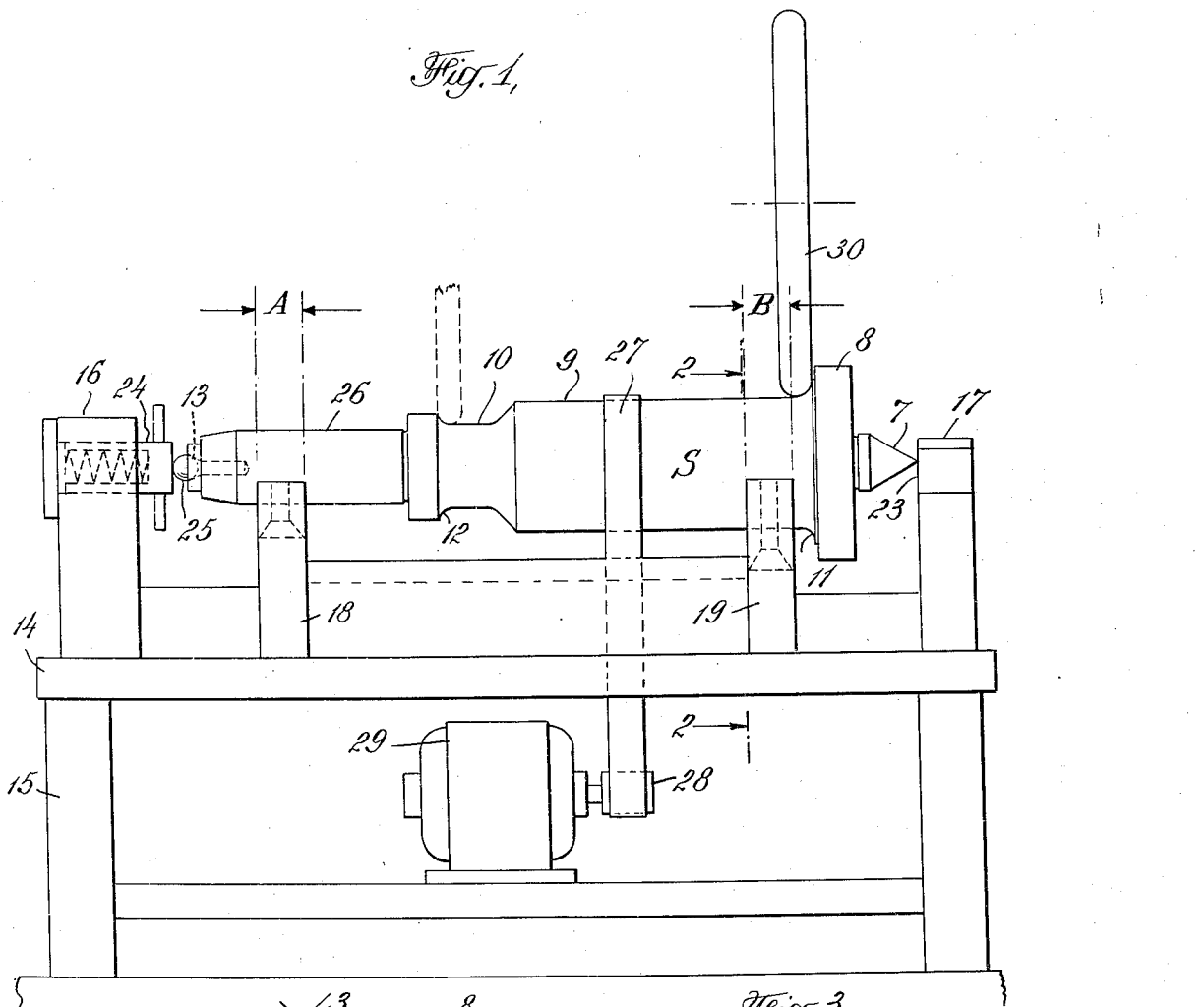
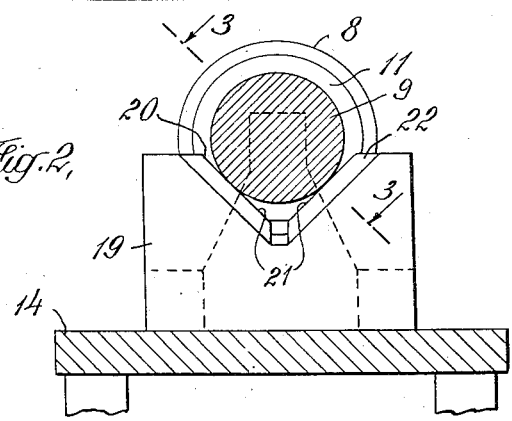
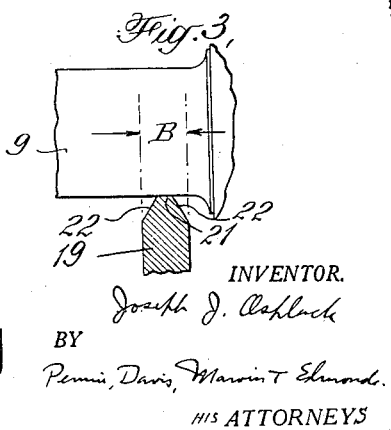

2,466,123

UNITED STATES PATENT OFFICE 2,466,123

METHOD OF MAKING SPINDLE BEARINGS

Joseph J. Osplack, Detroit, Mich., assignor to Vinco Corporation, Detroit, Mich., a corporation of Michigan Application November 15, 1943, Serial No. 510,321

4 Claims. (Cl. 29—148.4)

This invention relates to spindles for use in high precision instruments and more particularly concerns an improved true running spindle and bearing assembly and a method for making the same.

In the manufacture of high precision machine parts and tools, it is necessary that the finished elements be inspected to determine whether their dimensions are within permitted tolerances. Many circular section parts such as gears, splines and the like are inspected by mounting the part on a rotary spindle or between a pair of rotary spindles and measuring the gear or spline teeth or other elements as the part is turned to successive positions around the spindle axis. Optical apparatus has been devised capable of making measurements to an accuracy of the order of one-millionth of an inch and such measuring apparatus is particularly well adapted for operations of the type described. When previously known spindles are employed to support the parts measured by such apparatus, the departure of the spindle from true circular movement introduces inaccuracies that are substantial as compared with the degree of precision attainable by the optical system.

Spindles for the described purpose are mounted in anti-friction ball bearings to insure smooth operation without substantial wear or bearing play. Ball bearings are preferable, but I have found that ball bearings made by conventional procedure do not run precisely true.

It is the object of the present invention to provide an improved ball bearing mounted spindle for precision instruments which turns freely with a minimum bearing clearance and which runs so true about its axis that extremely accurate measurements can be made on parts supported by and rotated on the spindle. Another object of the invention is to provide a spindle and bearing assembly of the type described which may be readily assembled and adjusted to eliminate both binding and excess clearance. A further object of the invention is the provision of an improved method for making a true running ball bearing mounted spindle of the type described.

The invention will be described in connection with a specific embodiment thereof which is illustrated in the accompanying drawings. In the drawings;

Fig. 1 is an elevation showing a spindle mounted in a fixture for use in forming inner ball races;

Fig. 2 is a sectional view taken along the line 2—2 of Fig. 1;

Fig. 3 is a view taken along the line 3—3 of Fig. 2 showing a portion of the spindle mounting means in section;

Fig. 4 is a sectional view of an outer ball race mounting ring employed in assembling the disclosed embodiment of my improved spindle, the section being taken along the line 4—4 of Fig. 5;

Fig. 5 is an inner end elevation of the mounting ring shown in Fig. 4; and

Fig. 6 is a sectional view of the finished spindle and bearing assembly mounted in the frame of a precision instrument, the section being taken along planes indicated by the line 4—4 in Fig. 5.

The spindle S of the disclosed embodiment comprises an elongated cylindrical section element formed of steel. As shown, the spindle S has a center point 7 at one end, an adjacent head 8, a central portion including a large barrel 9 and a reduced bearing section 10 and an end shaft 26. In accordance with the invention, two inner ball races 11 and 12 of circular section are formed directly on the spindle at spaced points. The race 11 shown is close to the head 8 at the center point end of the spindle, and the race 12 is formed at one end of the reduced section 10. One aspect of my invention concerns an improved method of fabricating the spindle which produces truly round ball races accurately centered with respect to an axis passing through the center point 7. The desired accuracy cannot be obtained by the conventional method of grinding the spindle while it is held between centers and rotated.

In accordance with my invention, the spindle S is cast or forged and machined or otherwise formed by conventional methods to approximately its final shape but with the cylindrical surfaces 9, 10, 11, 12 and 26 as well as the center point 7 slightly oversize. A center recess 13 is formed in the end of the shaft 26 as shown. The machine finished spindle is hardened by suitable known heat treatment prior to the finishing operations to be described.

Two spaced circumferentially extending areas on the cylindrical surfaces of the hardened spindle, indicated at A and B in the drawing, are accurately lapped or otherwise finished in a known manner until they are absolutely round, that is, of truly circular section, within extremely close tolerances preferably of the order of one-millionth of an inch. The spindle S is then mounted for rotation by sliding contact of these truly round surface areas with plane fixed surfaces preferably comprising V-shaped knife edges. The fixture illustrated in Figs. 1, 2 and 3 may be employed for this purpose.

The spindle mounting fixture shown comprises a bed 14 supported by a suitable frame 15 and having end blocks 16 and 17 secured thereto adjacent the opposite ends thereof. Two spindle supports 18 and 19 are firmly mounted on the bed 14 between the end blocks 16 and 17. The supports are of similar form, each having a V-shaped knife edge notch 20 in its upper edge, as best shown in Fig. 2. The notches 20 comprise two plane angularly disposed knife edges 21 which lie substantially at right angles to each other in the disclosed embodiment. The edges of the notches are beveled as shown at 22 to provide narrow knife edge bearing surfaces. The supports 18 and 19 are so spaced longitudinally of the bed 14 as to respectively engage the truly round surface areas A and B on the spindle S, and the notch of the support 18 is disposed higher than that of the support 19 so that the spindle when cradled in the notches lies with its axis substantially horizontal as shown in Fig. 1.

The end block 17 has a plane inner face 23 which lies at right angles to the axis of the spindle S carried in the supports 18 and 19. The other end block 16 carries a spring pressed plunger 24 which engages a spherical ball 25 placed in the recess 13 at the shaft end of the spindle. The spindle S is thus cradled in the V-notches of the supports 18 and 19 with its center point 7 pressed against the face 23 of the block 17 by the plunger 24.

The ball races 11 and 12 are finished to final form while the spindle is supported and rotated on the truly round surface areas A and B. For this purpose, a driving belt 27 is passed over the barrel 9 of the spindle and around a driving pulley such as the pulley 28 of a motor 29 suitably mounted beneath the bed 14. The belt 27 is tensioned sufficiently to firmly press the spindle into the notches 20 of the supports 18 and 19, whereby the surface areas A and B slide on and are maintained in contact with the knife edges 21 of the support notches 20. In this manner, truly circular motion is imparted to the spindle, and any minute eccentricity of the center point 7 or shaft 26 with respect to the truly round areas A and B does not disturb this motion since the ends of the spindle are not radially confined.

With the spindle rotated in the manner explained, the ball races 11 and 12 are accurately finished by suitable means. This may include grinding with a grinding wheel 30 which may be supported and rotated about an axis substantially parallel to that of the spindle by known mechanism. The peripheral surface of the wheel 30 is accurately dressed to the desired radius of the ball races 11 and 12 and the wheel is moved in a known manner to grind each race in turn. The surfaces of the ground races 11 and 12 may then be further finished by high precision lapping.

The spindle S is now assembled in the supporting structure of the precision instrument or other device in which it is to operate. As shown in Fig. 6, this structure may comprise a massive frame member 31 having an opening therethrough in which the spindle S is mounted. An accurately formed outer ball race 33 which may be made by standard procedure is secured within one end of the opening 32 by machine screws 34 as shown. The spindle S is inserted, shaft end first, through the outer race 33, bearing balls 35 are placed between the barrel 9 and this race and the spindle is moved to the left to the position shown in Fig. 6 with the balls 35 engaged between the inner race 11 and the outer race 33. The outer ball race 36 for the shaft end of the spindle is also accurately formed by standard procedures. This race 36 is inserted around the reduced portion 10 of the spindle and bearing balls 37 are inserted between the races 36 and 12. The outer shaft end race 36 is then adjusted to the proper position relative to the other outer race 33 by improved means now to be described.

A substantially circular plate 38 having a central opening 39 is provided with a plurality of circumferentially aligned and spaced pads or raised portions 40 on its inner face adjacent its periphery, as best shown in Figs. 4 and 5. These pads 40 have plane faces adapted to engage a finished surface 42 surrounding the opening 32 in the frame 31. A set of inner circumferentially spaced pads 43 is provided on the inner face of the plate 38, these pads being aligned along a circular path of smaller radius than that on which the pads 40 are disposed. As shown in Fig. 5, the pads 40 and 43 are arranged in diametrically aligned pairs with the pads 43 disposed in the angular intervals between the pads 40. This permits the pads 40 and 43 to be independently dressed or ground down by suitable means such as a surface grinder which can be arranged to simultaneously grind opposite pairs of the pads of either set 40 or 43. Screw holes 44 extend through the plate 38 in the pads 40 and similar holes 45 extend therethrough in the pads 43.

The plate 38 is secured to the frame 31 by the screws 41 with the pads 40 engaging the surface 42 at the point marked $a$ in Fig. 6. The shaft end outer ball race 36 is secured to the plate 38 by the screws 46 with the outer face of the race abutting the faces of the pads 43 at the point designated $b$ in Fig. 6. Since the distance between the inner ball races 11 and 12 is fixed, it is essential that the outer ball race 36 be precisely spaced with respect to the race 33 in order that both bearings may have the proper clearance. This is accomplished by grinding down one or the other of the sets of pads 40 or 43 on the plate 38. After the plate 38 has been initially assembled as described, the bearings usually have excessive axial clearance since grinding stock has been left on the end faces of the pads 40 and 43. The amount of this clearance is measured by a dial indicator or other suitable means, the plate 38 is removed and the measured amount is ground off the inner pads 43. The plate is again assembled and the bearing clearance again checked. If the clearance is still excessive, the faces of the pads 43 are ground down further, whereas if too little clearance remains, so that the bearings bind, the end faces of the outer pads 41 are ground until the correct clearance is obtained. Thus by grinding the pads 43, the ball race 36 may be moved to the left to reduce bearing clearance, and by grinding the pads 41 the race may be moved to the right to increase the clearance, and a close clearance adjustment is thereby attained.

After final assembly of the spindle S, the center point 7 is ground true by rotating the spindle in its bearings and applying a suitably mounted rotating grinding wheel to the center point. This operation insures that the center runs true with respect to the axis of rotation of the spindle in its bearings.

My improved ball bearing mounted spindle may be used in various instruments and devices where a precisely true running rotary support is required. In one such application, it serves as the work supporting spindle of an optical dividing head, and for this purpose a face plate 48 may be suitably secured to the spindle head 8 and an index wheel 49 may be secured to the spindle shaft 26 to cooperate with an index plate 50 fixed to the frame 31. Suitable operating means 51 may be fixed to the shaft 26 to turn the spindle.

In the foregoing specification and the appended claims, the term "finishing" is used generically to cover any and all of the operations necessary to produce a surface of the required accurate contours and dimensions, such operations including grinding, lapping, polishing and the like.

I claim:

1. The method of making a truly running ball bearing mounted spindle which includes the steps of hardening a preformed elongated metal spindle, forming two spaced circumferentially extending outer surface areas of truly circular section on said spindle, cradling the spindle substantially horizontally with said surface areas engaging notches on fixed supports, rotating the spindle on such supports while confining the same against axial movement, and finishing spaced ball bearing races in the spindle during such rotation.

2. The method of making a truly running ball bearing mounted spindle which includes the steps of hardening a preformed elongated metallic spindle forming two axially spaced circumferentially extending outer surface areas of truly circular section on said spindle, supporting the spindle with points on each of said surface areas respectively engaging fixed plane surfaces and with the spindle ends confined against axial movement, rotating said spindle while so supported on said surface areas and finishing spaced ball bearing races in said spindle during such rotation.

3. The method of making a truly running ball bearing mounted spindle which includes the steps of hardening a preformed elongated metallic spindle forming two axially spaced circumferentially extending outer surface areas of truly circular section on said spindle, said spindle having a center point at one end, supporting said spindle by the respective engagement of two spaced points on each of said surface areas with fixed angularly disposed knife edges, rotating said spindle on such support, finishing spaced ball bearing races in said spindle during such rotation, rotating the spindle in bearings including the bearing races so cut and finishing the center point of the spindle while it rotates in such bearings.

4. The method of making a truly running ball bearing mounted spindle which includes the steps of hardening a preformed elongated metallic spindle having a center point at one end forming two axially spaced circumferentially extending outer surface areas of truly circular section on said spindle, supporting said spindle by sliding engagement of said surface areas with fixed substantially plane surfaces, rotating said spindle while so supported, finishing spaced ball bearing races in said spindle during such rotation, rotating said spindle in bearings including the bearing races so cut and grinding the center point of the spindle true with respect to its axis of rotation while said spindle rotates in such bearings.

JOSEPH J. OSPLACK.

REFERENCES CITED

The following references are of record in the file of this patent:

UNITED STATES PATENTS

| Number | Name | Date |
|---|---|---|
| 588,496 | Smith | Aug. 17, 1897 |
| 1,808,392 | Waldrich | June 2, 1931 |
| 1,949,527 | Briney | Mar. 6, 1934 |
| 1,984,718 | Wistrand | Dec. 18, 1934 |